(12) United States Patent
Gasslbauer

(10) Patent No.: US 8,851,246 B2
(45) Date of Patent: Oct. 7, 2014

(54) BRAKE PAD FOR A DISC BRAKE

(75) Inventor: Franz Gasslbauer, Johanniskirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 123 days.

(21) Appl. No.: 13/359,283

(22) Filed: Jan. 26, 2012

(65) Prior Publication Data
US 2012/0152669 A1 Jun. 21, 2012

Related U.S. Application Data

(63) Continuation of application No. PCT/EP2010/004456, filed on Jul. 21, 2010.

(30) Foreign Application Priority Data

Jul. 27, 2009 (DE) .......................... 10 2009 034 858

(51) Int. Cl.
*F16D 69/04* (2006.01)

(52) U.S. Cl.
CPC .... *F16D 69/0408* (2013.01); *F16D 2200/0013* (2013.01)
USPC ................................... 188/250 G; 188/250 R

(58) Field of Classification Search
CPC .......................... F16D 65/092; F16D 2069/004
USPC .................. 188/250 R, 251 R, 251 M, 250 G
See application file for complete search history.

(56) References Cited

U.S. PATENT DOCUMENTS

| 2003/0141164 A1* | 7/2003 | Willerscheid et al. .... 192/107 R |
| 2008/0271963 A1 | 11/2008 | Macke et al. |
| 2010/0229369 A1 | 9/2010 | Gasslbauer |

FOREIGN PATENT DOCUMENTS

| CA | 2 300 401 A1 | 12/1999 |
| DE | 2 048 584 | 4/1972 |
| DE | 197 06 123 A1 | 8/1998 |
| DE | 10 2006 004 550 A1 | 8/2007 |
| DE | 10 2007 017 785 B3 | 11/2008 |
| GB | 2 299 382 A | 10/1996 |
| WO | WO 02/070916 A1 | 9/2002 |
| WO | WO 2007/045493 A1 | 4/2007 |

OTHER PUBLICATIONS

International Preliminary Report on Patentability dated Feb. 16, 2012 (Seven (7) pages).
German Office Action dated Dec. 11, 2009 including English-language translation (Nine (9) pages).
International Search Report dated Nov. 5, 2010 including English-language translation (Four (4) pages).

* cited by examiner

*Primary Examiner* — Anna Momper
(74) *Attorney, Agent, or Firm* — Crowell & Moring LLP

(57) ABSTRACT

A brake pad for a disc brake, particularly of a vehicle, has a pad carrier plate designed as a cast part, with raised, integrally formed positive-locking parts and a neighboring identifier in the form of a series of raised characters and/or numbers that are enclosed by a friction lining.

11 Claims, 2 Drawing Sheets

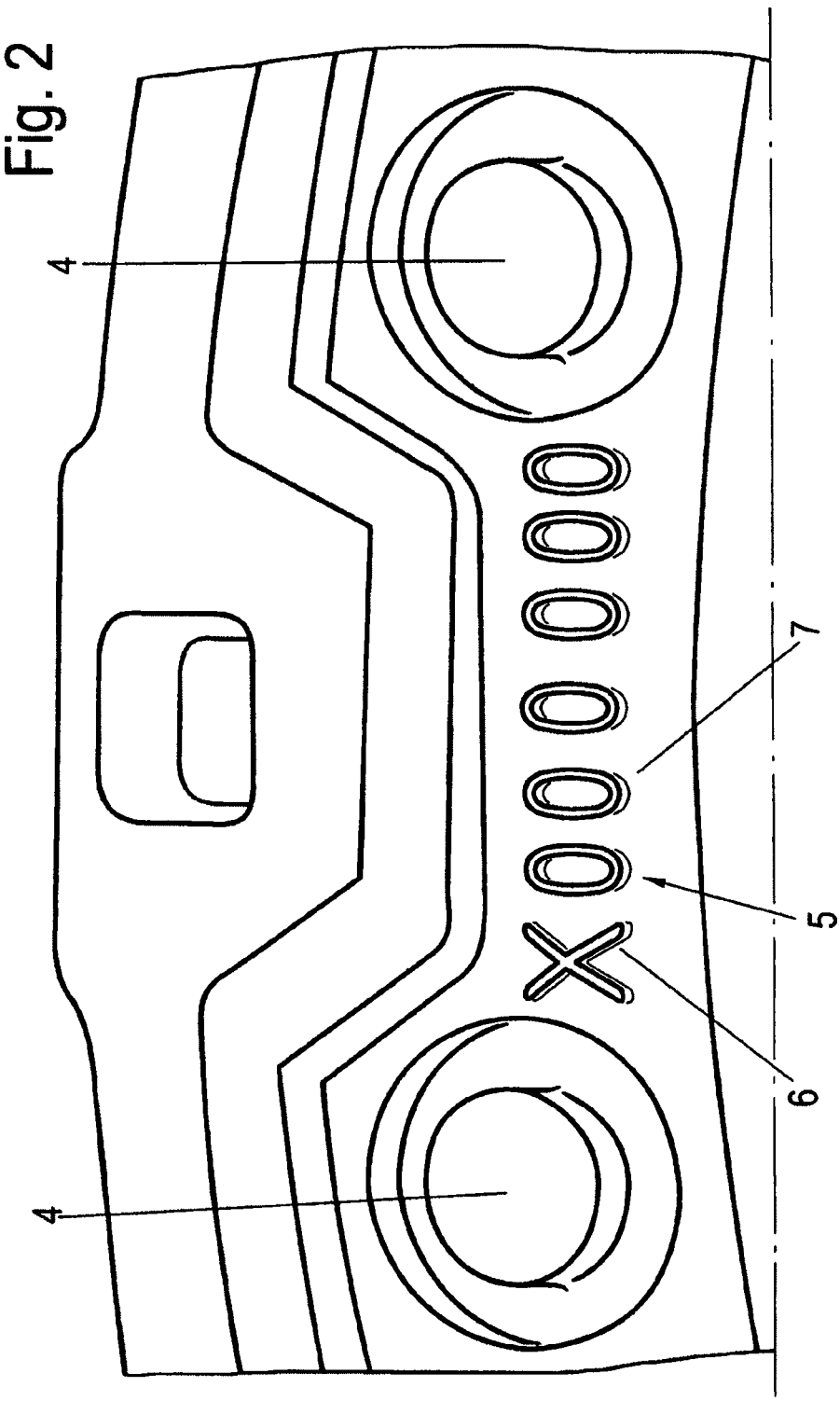

BRAKE PAD FOR A DISC BRAKE

CROSS-REFERENCE TO RELATED APPLICATIONS

This application is a continuation of PCT International Application No. PCT/EP2010/004456, filed Jul. 21, 2010, which claims priority under 35 U.S.C. §119 from German Patent Application No. DE 10 2009 034 858.1, filed Jul. 27, 2009, the entire disclosures of which are herein expressly incorporated by reference.

BACKGROUND AND SUMMARY OF THE INVENTION

The invention relates to a brake pad for a disc brake and, in particular, to a vehicle brake pad having a pad carrier plate which is configured as a cast part and has elevated, integrally formed positively locking parts which are enclosed by a friction lining in order to hold the friction lining.

In addition to a brake disc, disc brakes for vehicles, in particular for commercial vehicles, also include two brake pads which, if required, that is to say in the event of a braking operation, can be pressed against the friction faces of a brake disc.

Here, each brake pad consists of a pad carrier plate and a friction lining which is fastened on the pad carrier plate and, in the use position, bears frictionally against the associated friction face of the brake disc.

The connection of the friction lining to the pad carrier plate is given special significance, since high loads occur which result from operational jolts and frictional heat which is produced during braking.

In order to produce a correspondingly fixed connection, which can absorb flexural and shear loads occurring in addition to the abovementioned jolt and heat loading, it is known to integrally form positively locking mechanisms on a basic body of the pad carrier plate in the form of raised elevations. These elevations are configured with a round or angular cross-section, or are configured to be pimple-shaped, and are enclosed by the applied friction lining.

In the overlap region of the friction lining, adjacent to the positively locking parts, that is to say on that side of the basic body of the pad carrier plate which faces the friction lining, an identifier, for example what is known as a code number, is provided in the brake pad. Via the identifier, the pad carrier plate can be identified before the friction lining is applied.

The identifier, in the form of characters, such as letters or the like, and/or digits, is cast as a depression into the pad carrier plate.

To this extent, there is no positively locking connection between the friction lining and the pad carrier plate in this region, in a comparable manner to the connection by way of the positively locking parts.

In order to attach the friction lining to the pad carrier plate even in the region which is defined by the identifier, an adhesive bond is provided which, however, cannot be loaded to such an extent as a positively locking connection.

The adhesion capability of the adhesive bond is reduced, in particular, by the frictional heat produced during braking, with the result that detachment of the friction lining can occur permanently, with a correspondingly higher loading of the positively locking mechanism and/or the positively locking connections.

An optimization of the service life of a brake lining of this type is therefore inherently not possible.

The invention is based on the object of developing a brake pad such that an improved connection between the friction lining and the pad carrier plate is achieved with low structural and production technology outlay and, as a beneficial consequence, the service life of the friction lining is improved.

This and other objects are achieved by a brake pad having a pad carrier plate which is configured as a cast part and has elevated, integrally formed positively locking parts which are enclosed by a friction lining in order to hold the friction lining. Adjacent to the positively locking parts, an identifier in the form of a row of characters and/or digits is provided, which identifier is covered by the friction lining. The characters and/or digits have a raised configuration.

A substantially improved, i.e., better fixed connection of the friction lining on the pad carrier plate is achieved by the raised configuration of the characters and/or digits; this relates not only to the region which is defined by the identifier, but rather to the entire connection, as it were, as a result of the reduced loading of the remaining positively locking parts.

A partial reduction in adhesion, in particular as a result of the action of heat, is ruled out in practice, which results in an improvement in the service life, with the resulting cost advantages.

The elevated height of the characters and/or digits of the identifier is preferably equal to the height of the positively locking parts, with the result that the friction material can be supported to the same extent on the positively locking parts and on the identifier, whereby a uniform attachment of the friction lining is achieved over the entire pad carrier plate.

Otherwise, the profiling of the individual characters and/or digits can be selected to be different, that is to say, for example, with undercuts, with depressions in the attachment region to the basic body or by an oblique or perpendicular orientation of the bounding walls, the characteristics of the identifier, that is to say its ability to be identified, not being impaired.

Moreover, it is to be emphasized as particularly advantageous that this improvement of the brake pad can be realized in a virtually cost-neutral way.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows an enlarged part detail of the pad carrier plate according to FIG. 1.

DETAILED DESCRIPTION OF THE DRAWINGS

Figure 1:
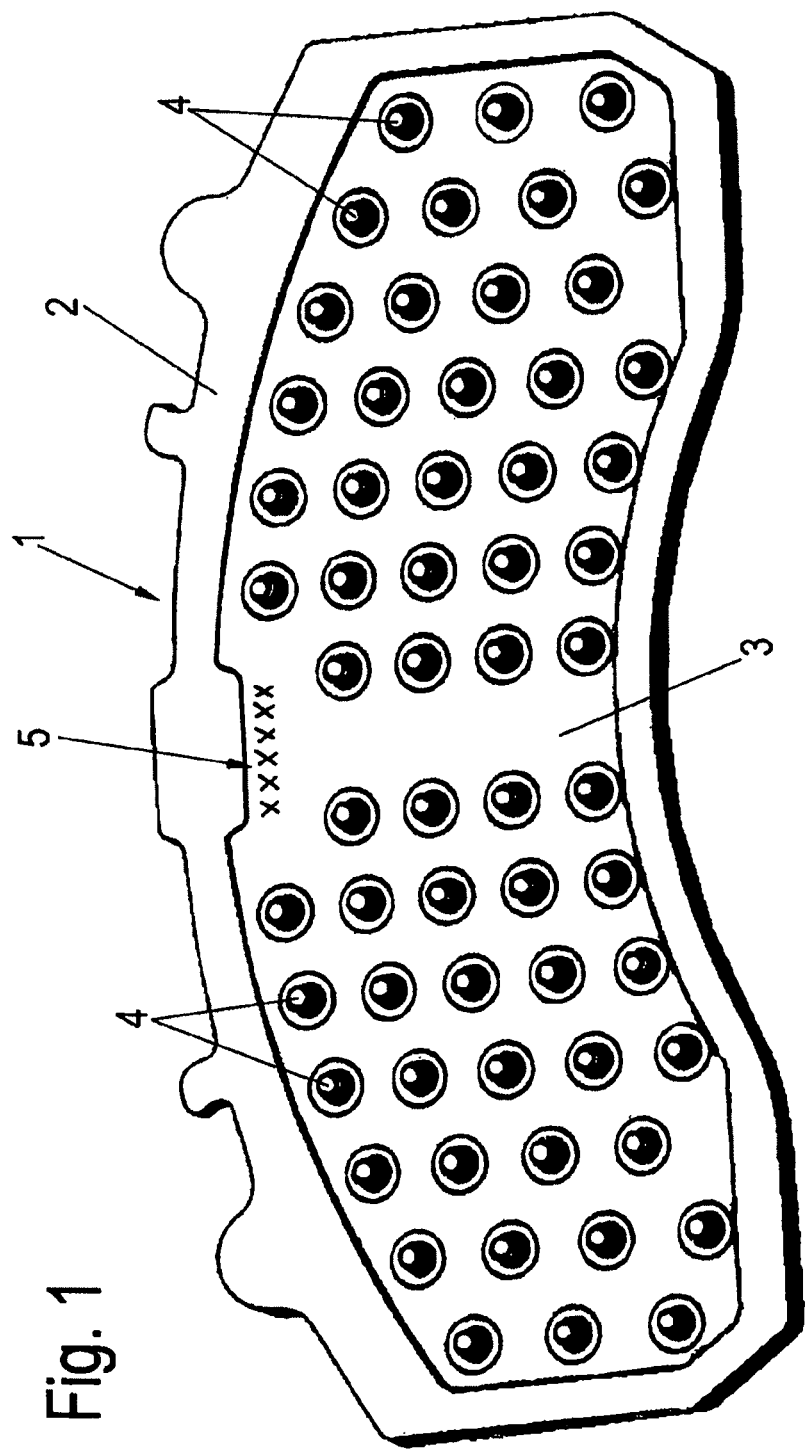
FIG. 1 shows an exemplary pad carrier plate of a brake pad according to the invention in a perspective plan view.

The figures show a pad carrier plate 1, which is a constituent part of a brake pad which, moreover, has a friction lining (not shown) connected fixedly to the pad carrier plate 1, with contact being made by positively locking parts 4.

The positively locking parts 4 of the pad carrier plate 1, which consists of a cast material, are cast onto a planar basic body 2 within an overlap region 3 of the friction lining and are configured in the exemplary embodiment as raised pegs with a round cross-section. In the example which is shown, the positively locking pegs 4 are arranged so as to lie next to one another in parallel, arcuately oriented, rows in accordance with the contour profile of the base plate 2.

An identifier 5, consisting of characters 6 and/or digits 7, which are shown here merely by way of example, is provided such that it is arranged approximately centrally in the overlap region 3, in the present case in the upper edge region.

As, in particular, FIG. 2 shows very clearly, the characters 6 and/or digits 7 have a raised or elevated configuration (extending above the planar surface of the basic body 2) and are cast on, just like the positively locking parts 4.

The height of the characters 6 and/or digits 7, is preferably, equal to the height of the positively locking parts 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad for a disc brake of a vehicle, comprising:
    a cast pad carrier plate having, on one major surface thereof, elevated integrally formed positive-locking parts and an identifier in the form of a row of raised characters and/or digits; and
    a friction lining arranged on an area of the major surface and enclosing the positive-locking parts and the identifier, wherein
        the elevated integrally formed positive-locking parts have a uniform structure that covers a majority of the one major surface and function only to fix the friction lining to the one major surface, and
        the row of raised characters and/or digits: i) has a structure different than the uniform structure, ii) fixes the friction lining to the one major surface, and iii) identifies a type of friction lining material that is to be applied to the one major surface during manufacturing of the brake pad.

2. The brake pad according to claim 1, wherein the row of raised characters and/or digits is cast on the pad carrier plate.

3. The brake pad according to claim 2, wherein a height of the row of raised characters and/or digits corresponds to a height of the elevated integrally formed positive-locking parts.

4. The brake pad according to claim 3, wherein a profile of the row of raised characters and/or digits corresponds with a depression in the pad carrier plate.

5. The brake pad according to claim 4, wherein bounding walls of the row of raised characters and/or digits are arranged to extend at least one of perpendicular with respect to and obliquely with respect to the one major surface of the pad carrier plate.

6. The brake pad according to claim 1, wherein a height of the row of raised characters and/or digits corresponds to a height of the elevated integrally formed positive-locking parts.

7. The brake pad according to claim 1, wherein a profile of the row of raised characters and/or digits-corresponds with a depression in the pad carrier plate.

8. The brake pad according to claim 1, wherein bounding walls of the row of raised characters and/or digits are arranged to extend at least one of perpendicular with respect to and obliquely with respect to the one major surface of the pad carrier plate.

9. The brake pad according to claim 1, wherein the row of raised characters and/or digits fixes the friction lining to the one major surface via a direct contact between the row of raised characters and/or digits and the friction lining.

10. The brake pad according to claim 1, wherein
    the row of raised characters and/or digits is positioned on the one major surface so as to extend across an imaginary line that divides the brake pad along a length thereof, and
    the row of raised characters and/or digits is: i) in contact with an edge region of the friction lining, and ii) adjacent to a region of the one major surface that is devoid of any friction lining.

11. A brake pad for a disc brake of a vehicle, comprising:
    a cast pad carrier plate having a first surface upon which a friction lining material is disposed, and a second surface that is opposite to the first surface, and
    a plurality of positive-locking parts that are formed on the first surface, wherein
        a majority of the plurality of positive-locking parts: i) have a uniform structure, and ii) are elevated and configured to fix the friction lining material to the first surface,
        a minority of the plurality of positive-locking parts: i) have a structure different than the uniform structure, ii) are arranged in a row, and iii) are elevated and configured to both fix the friction lining material to the first surface and to serve as an identifier of the brake pad, and
        the friction lining material covers both the majority and the minority of the plurality of positive-locking parts.

\* \* \* \* \*